Nov. 23, 1965 G. P. MILLER ETAL 3,219,988

MAGNETIC RECORDING DEVICE

Filed Feb. 1, 1961 3 Sheets-Sheet 1

GEORGE P. MILLER
BENNY J. TERRACCIANO
INVENTORS

BY

FRASER AND BOGUCKI
ATTORNEYS

GEORGE P. MILLER
BENNY J. TERRACCIANO
INVENTORS

BY

FRASER AND BOGUCKI
ATTORNEYS

Nov. 23, 1965    G. P. MILLER ETAL    3,219,988

MAGNETIC RECORDING DEVICE

Filed Feb. 1, 1961    3 Sheets-Sheet 3

GEORGE P. MILLER
BENNY J. TERRACCIANO
INVENTORS

BY

FRASER AND BOGUCKI
ATTORNEYS

United States Patent Office 3,219,988
Patented Nov. 23, 1965

3,219,988
MAGNETIC RECORDING DEVICE

George P. Miller, Woodland Hills, and Benny J. Terracciano, Canoga Park, Calif., assignors, by mesne assignments, to The Bunker-Ramo Corporation, Stamford, Conn., a corporation of Delaware Filed Feb. 1, 1961, Ser. No. 86,413
10 Claims. (Cl. 340—174.1)

This invention relates to systems for recording and reproducing information magnetically, and more particularly to devices for automatically positioning magnetic heads relative to a moving magnetic surface.

In using a magnetic drum or other moving magnetic member for the storage and reproduction of information, a number of performance factors are directly dependent upon the relationship between the magnetic transducer and the magnetic medium. The spacing which is maintained between the pole tips of the magnetic transducer and the recording surface with which it cooperates may be of controlling importance. In recording, for example, the closer the pole tips of a magnetic transducer are to the recording surface the greater may be the density of the recorded information. In the reproduction of signals, the amplitude of the signals derived from the transducer increases as the distance between the pole tips and the record surface diminishes.

It is well known, therefore, that it is necessary to maintain the pole tips of a magnetic transducer in contact with, or in very close relation to, a magnetic recording surface. For many applications, however, it is impractical to use contact recording, because wear of the magnetic transducer or the recording surface may cause a rapid degradation in performance. Thus, in a magnetic drum system, the extremely high rotational speed of the drum may result in rapid wear of the drum surface, or associated magnetic transducers, or both. In mobile systems, or extremely compact systems, there is no opportunity to continually readjust the heads and to replace worn heads with new heads. Wear of the drum surfaces to a point at which reliability is affected is to be avoided at all costs.

In order to maintain the pole tips of magnetic transducers in close relation to magnetic recording surfaces for most efficient operation, therefore, many head mounting and positioning devices have been developed. These devices are intended to function to hold the magnetic transducers or heads at a minute distance, of the order of $\frac{1}{1000}$ of an inch or less, from the recording surface. For a number of reasons given below, these devices are not satisfactory for modern applications.

A considerable part of a computer or data processing system is devoted to its memory system, such as a magnetic drum or a random access memory. Magnetic drums are widely employed in small size systems, not only because of their proven reliability but also because of their high capacity for volume and the relative simplicity with which access can be gained to stored information.

The volumetric efficiency of a magnetic drum system is in turn directly related to the density with which information may be stored on the drum, both with respect to storage along a given track and the spacing between adjacent tracks. High information density along a given track can be achieved, as we have seen above, by the use of a magnetic transducer in very close relation to the recording surface. The close spacing of adjacent tracks in turn requires that a great many magnetic transducers or heads be used, and that they be very precisely spatially related along the axis of rotation of the magnetic drum. Furthermore, in order to decrease the access time to a selected storage address in the drum, like sets of magnetic heads are usually used at different circumferential positions about the drum. With spaced heads only a third, or a quarter, or a lesser fraction of a drum rotation is required at the maximum to make information available, in place of the maximum of a full drum rotation which would be required with a single set of magnetic heads at one given circumferential location.

The need for a great many magnetic heads, and a very precise spacing between each of the magnetic heads and the magnetic recording surface, emphasizes the difficulties which are encountered with many prior art systems. Individual adjustment of the great many magnetic heads is not only tedious and time consuming but a highly unreliable process. The number and type of fixtures needed to hold each of the magnetic heads in position with the tolerances demanded is expensive, and may well occupy more space and require more weight than can be accommodated with a mobile or very compact system. Even if these difficulties could be overcome, fundamental operative difficulties might still remain. For example, eccentricity of the magnetic drum or surface imperfections on the magnetic drum might cause irregular signal recording and reproduction, or forceful contact between the recording surface and some of the magnetic heads, resulting in damage or breakage of the drum or the magnetic heads or both.

In order to overcome these multiple difficulties while providing an extremely compact and efficient head mounting design, there have been utilized head support mechanisms which ride on an "air bearing" on the surface of the drum or other magnetic recording medium. A drum moving through a fluid medium such as air carries a thin film of air along at its surface, this thin film forming a boundary layer which is capable of providing considerable resistive force to an external object. This principle is utilized, in a particularly efficient and unique fashion, in a device for automatically positioning magnetic heads relative to a moving magnetic surface which is described in a copending application for patent entitled, "Magnetic Recording Device," Serial No. 67,190 filed November 4, 1960, by George P. Miller and now abandoned.

As disclosed therein, magnetic heads may be held in very close and substantially constant relation to a moving magnetic recording surface by mounting the heads on a pivotally mounted member which is shaped substantially to mate with the magnetic recording surface. The pivotally mounted member is disposed in the path of the fluid boundary layer, and utilizes the viscosity and mass of the fluid medium to hold the magnetic heads a precise distance away from the magnetic recording surface. As further disclosed therein, the pivotally mounted member is so controlled as to seek an angle of attack relative to the boundary layer and the drum surface, if a drum is used, in which the leading edge of the member is spaced further from the surface of the drum than is the trailing edge of the member. With this arrangement, the magnetic heads are held at the desired position and substantially without oscillatory effects.

It is therefore an object of the present invention to provide a mounting device for magnetic transducers which utilizes the boundary layer of a fluid medium at the surface of a recording member, in an arrangement which is particularly compact and permits precise location of a great many magnetic transducers relative to the recording member.

Another object of the present invention is to provide an improved mounting device for magnetic heads to be spaced apart from a magnetic drum, which utilizes a simple and inexpensive arrangement to maintain the magnetic heads at precise and uniform distances from the drum.

Another object of the present invention is to provide improved positioning mechanisms for magnetic transducers, which device automatically maintains the magnetic heads in close but non-contacting relation to a magnetic drum.

Positioning mechanisms in accordance with the present invention utilize a support shoe shaped to mate with a magnetic recording medium, and support arm means coupled to the support shoe. The support arm means is pivotally mounted at one end in a frame, and engaged by a spring member coupled to the frame. The force exerted by the spring urges the support shoe against the boundary layer of fluid about the magnetic recording medium. Magnetic heads mounted on the support shoe are maintained at a selected distance away from the surface of the record medium. Means are also provided for lifting the support shoe away from the record medium in the event the record medium is below a selected speed level so that the boundary layer of the fluid medium does not provide a sufficient mass of fluid between the recording surface and mating shoe surface.

More specifically, a magnetic mounting device in accordance with the invention, given by way of example, may utilize V-groove surfaces in an external frame about a magnetic drum. The V-groove surfaces, being parallel to the axis of rotation of the drum, are pivotally mounted in the V-grooves in the frame and contain centrally disposed support elements coupled to a magnetic head support shoe which has a smooth concave surface mating with the drum surface. The head support shoe rides on the fluid film at the surface of the drum, and heads on the support shoe are held at a selected relatively minute distance from the drum by an adjustable spring coupled to the frame and acting uniformly on the support arm members. The free ends of the support arm members are in contact with cam members which are rotated to pivot the support arms and the head support shoe away from the drum when the drum is rotating at less than a desired speed.

Another feature of the present invention resides in the use of an electrical insulation coupling between the head support shoe and the magnetic drum, together with a circuit which provides an appropriate indication when the spacing between the support shoe and the drum becomes less than adequate.

In accordance with another aspect of the invention, the head support shoe is pivotally mounted with respect to the support arms and frictionally damped. The frictional damping of the head support shoe permits the support shoe to pivot to seek a stable position but eliminates oscillation of the mechanism.

A better undertstanding of the invention may be had by reference to the following description, taken in conjunction with the accompanying drawings, in which.

Magnetic head positioning devices are perhaps best described in conjunction with magnetic drums, inasmuch as many advantages of devices according to the invention are realized with magnetic drum systems. A compact but high density memory system is provided by employing a considerable number of magnetic heads at different peripheral positions about a small size, high speed drum. In accordance with the present invention, exceptional efficiency is achieved by the use of a number of head positioning or mounting devices, each of which is associated with a different region on the drum, and each of which carries a considerable number of magnetic heads.

Figure 1:
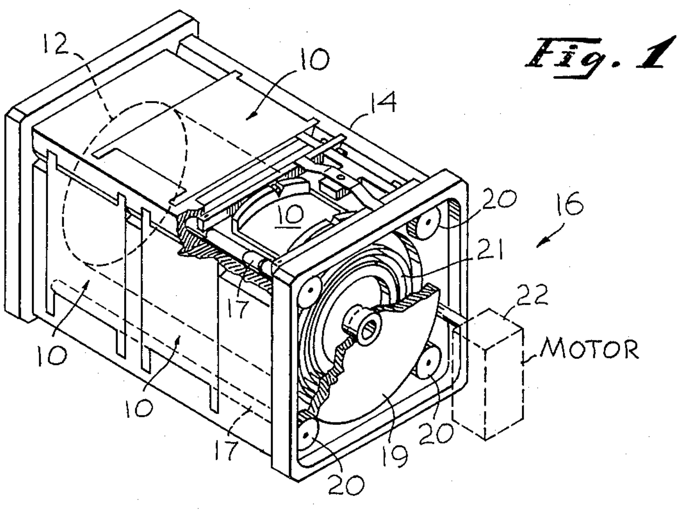
FIGURE 1 is a perspective view, partially broken away, of the relationship of the principal parts of one form of magnetic recording assembly in accordance with the present invention.

Thus, as shown in FIGURE 1, a number of separate magnetic head positioning devices 10 are positioned about the recording surface of the drum 12. Each of the head positioning devices utilizes the boundary layer of fluid (here assumed to be air) in which the drum 12 is immersed. In FIGURE 1, the outline of the drum 12 has been dotted in, and the various separate positioning devices have not been shown in precise detail. The gaseous or other fluid medium which encompasses the drum 12 can be maintained within a selected range of pressures and temperatures if desired. If air or another gas is used as the fluid medium, it is particularly desirable to maintain a substantially dust-free atmosphere, because of the extremely close spacings which are to be maintained between the magnetic heads and the recording surface of the drum. For simplicity in FIGURE 1, the individual magnetic heads have not been shown. The drum surface is assumed to be of hard material, such as an electroless nickel-cobalt plating, and to be substantially concentric about the axis of rotation of the drum. The axis of rotation of the drum 12 provides a convenient reference line to which the attitude and operation of other elements may be related.

The separate magnetic head positioning devices are pivotally mounted in and supported from a rigid external frame 14 which encompasses the drum 12. To achieve greater compactness, the drum 12 may be driven by an internal motor (not shown). If the frame 14 is rectangular, a number of different head positioning devices 10 may be used on each of the four frame 14 sides about the drum recording surface, although only two of the head positioning devices, magnetic heads and total recording density may be varied in accordance with the drum size and weight and the total storage capacity which it is desired to achieve.

At one end of the frame 14 is positioned a cam control mechanism 16 including a number of separate cam shafts 17, one of which is situated adjacent each of the sides of the frame 14 and in contact with the different head positioning devices 10 at that side. A central drive gear 19 concentric with the axis of rotation of the drum 12 engages separate pinions 20, each of which is coupled to a differnt one of the cam shafts 17. A spring 21 attached to frame 14 acts on the drive gear 19 to maintain the gear 19 in the selected first position which is the position desired when the drum 12 is below a chosen operating speed level. A small motor 22 which is selectively energized whenever the drum is at a chosen operating speed acts to overcome the action of the spring 21 and to maintain the drive gear and the associated cam shafts 17 in a selected second position which corresponds to the operating position. In the event of power failure, the spring 21 will return the drive gear 19 and its associated parts to the first position. Energization of the motor 22 may be by a time delay switch coupled to the actuating control for the drum system in a simple case. For fully automatic control, a magnetic or optical pickup coupled to the drum, and sensing circuits, may be used to determine when the drum 12 is at operative speed.

Figure 2:
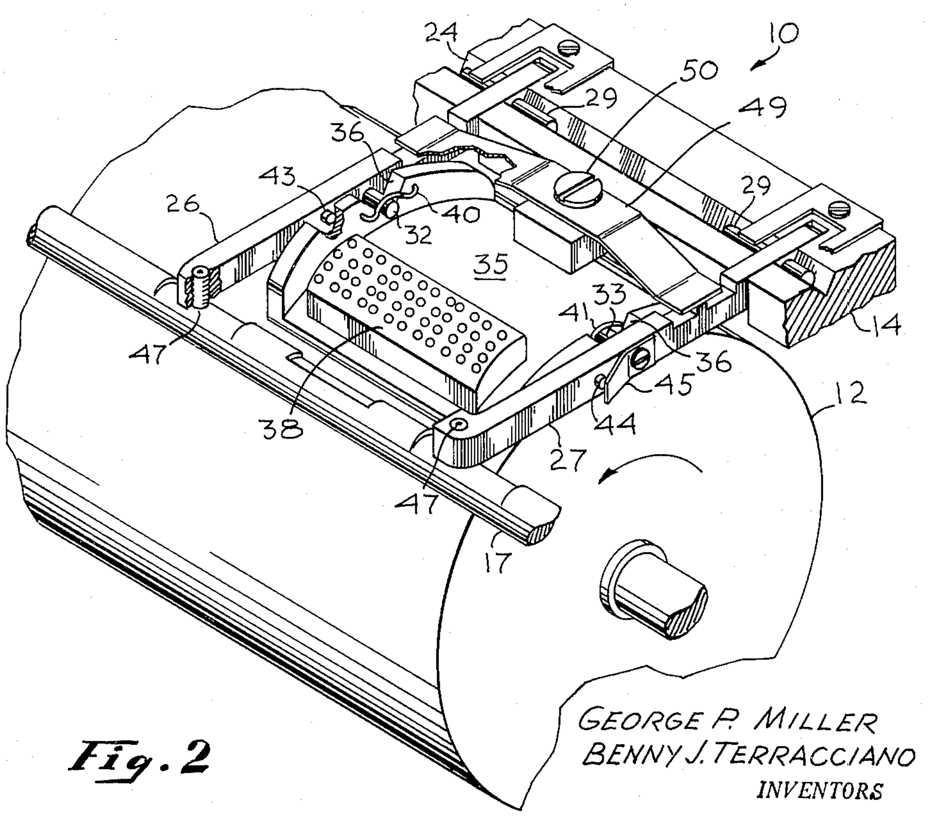
FIGURE 2 is a perspective view, partly broken away, of a magnetic head positioning device in accordance with the present invention.

The enlarged and detail representation of FIGURE 2 shows a preferred arrangement which may be employed for the head positioning devices 10. In this figure, only a portion of the frame 14 is shown, in order to show the other elements with greater clarity. The frame 14 is made of sufficient strength and rigidity to maintain a fixed relation to the drum 12 despite acceleration and normal operating forces. Spaced apart from the drum 12, the frame 14 is provided with indented V-groove surfaces 24 which are parallel to the axis of rotation of the drum 12. Each of a pair of radius arms 26, 27 extends in a direction normal to the V-groove surfaces 24 and includes bearing pins 29 which protrude normally outward from its sides, parallel to the axis of rotation of the drum 12. The bearing pins 29 are held seated against the V-groove surfaces 24 by the spring described below.

The radius arms 26, 27 are mirror images of each other, and include individual pivot pins 32, 33 which face toward each other in a central part of the arms 26, 27 along an axis parallel to the axis of rotation of the drum 12. These pivot pins 32, 33 are preferably an electrical insulting, low friction material, such as sapphire or glass.

A head support shoe 35 is pivotally mounted in the pivot pins 32, 33 by separate V-grooves 36. In accordance with the teachings of the Miller application identified above, the head support shoe 35 has a smooth concave surface which substantially mates with the surface of the drum 12. In a practical example, the radius of curvature of the head support shoe 35 is 0.1% greater than that of the drum 12. In accordance with the teachings of the Miller application above, this pivotal axis is close to the shaped surface and between the mid region of the shoe 35 and the trailing edge of the shoe 35. A magnetic head assembly 38 is here mounted adjacent the trailing edge of the shoe 35, and includes a number of miniature magnetic heads, each of which is associated with a different according recording track on the drum 12. As discussed in the Miller application, the point of pivot of the shoe 35 is selected in accordance with the spacing to be maintained between the heads and the surface of the drum 12, and in accordance with the mass and inertia presented by the heads and the associated wiring (not shown).

The V-grooves 36 in the head support shoe 35 are caused to seat against the pivot pins 32, 33 by spring friction clips 40, 41. The pivotal movement of the shoe 35 relative to the radius arms 26, 27 is further restrained by friction buttons 43, 44 which extend inwardly from each of the radius arms 26, 27, adjacent to the pivot pins 32, 33 and engage the adjacent sides of the head support shoe 35. One button 43 is fixed, but the other button 44 is a spring loaded by a small leaf spring 45 coupled to the associated radius arm 27. The leaf spring 45 acts with selected force to urge the friction button 44 against the shoe 35, so that the shoe 35 in turn contacts the fixed friction button 43. Thus the position of the shoe 35 along the axis of the drum 12 is precisely determined.

The radius arms 26, 27 are long enough to extend past the drum 12. Lift adjusting screws 47 at the free ends of the radius arms 26, 27 engage cam contour surfaces on the cam shafts 17. Between the axis on the radius arms 26, 27 about which the head support shoe 35 pivots, and the bearing pins 29 about which the radius arms 26, 27 pivot, the radius arms 26, 27 are engaged by an adjustable shoe loading spring 49. The shoe loading spring 49 extends normal to the radius arms 26, 27 and is supported on the frame 14 at the midpoint between the two radius arms 26, 27 by an adjustment screw 50. The shoe loading spring 49 is symmetrically disposed about the screw 50 in the frame 14, so that precisely equal forces are exerted on each of the radius arms 26, 27 as the adjustment screw 50 is turned. Point contact surfaces on the radius arms 26, 27 are in engagement with the spring 49 to assure uniform loading of the shoe 35.

Figure 3:
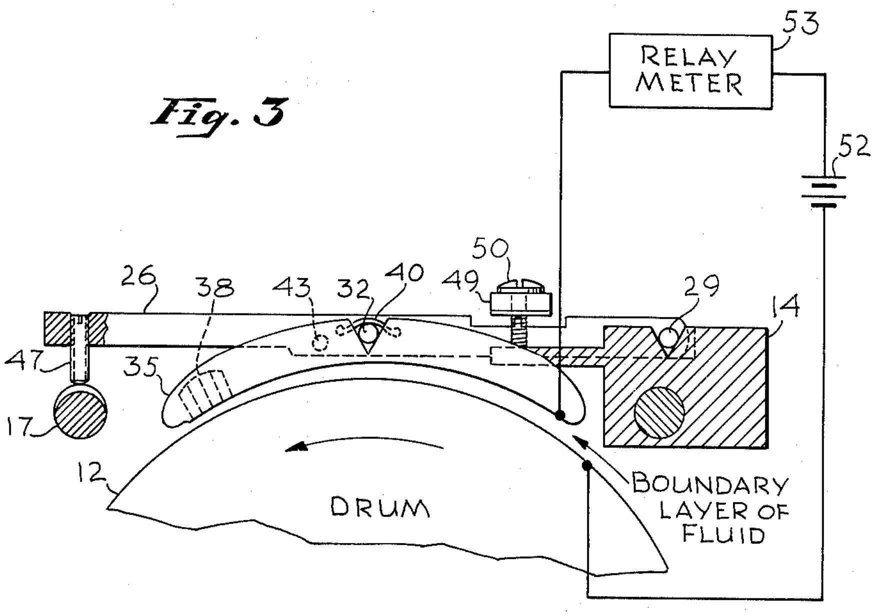
FIGURE 3 is an enlarged, simplified side view of the arrangement of FIGURE 2, showing a protective circuit used in conjunction therewith.

Operation of the arrangement of FIGURE 2 may be better understood by concurrent reference to FIGURE 3. The viscosity of the boundary layer of air at the surface of the drum 12 causes the air to move with the drum 12 and to be wedged between the drum 12 and the head support shoe 35. As the air is thus constricted, an appreciable lifting force is exerted on the shoe. The lifting force increases, as discussed in the Miller application, as the spacing between the shoe 35 and the drum 12 decreases. The position of the pivot pins 32, 33 relative to the length of the smooth concave surface of the shoe 35 is such that the leading edge of the shoe is further spaced from the drum 12 than is its trailing edge. The magnetic heads in the magnetic heads assembly 38 lie flush with the smooth concave surface of the shoe 35 and are accordingly held very close to the drum 12, but do not contact the drum.

In one practical arrangement in accordance with the invention, this type of head mounting and positioning arrangement is used in conjunction with a small sized, high speed drum and the entire drum device is contained within a space 3.7 by 3.7 by 7.4 inches. With 30 tracks per inch and a total of 122 recording tracks, together with a recording density of 350 bits per inch at a speed of 12,000 r.p.m., a total storage capacity of 300,000 bits was achieved. This extremely high storage capacity to volume ratio is largely derived from the compactness, efficiency and reliability of the head mounting devices.

A number of features of mounting devices in accordance with the invention should be appreciated. In the practical exemplification just mentioned, the shoe loading spring 49 was adjusted to urge the head support shoe 35 toward the drum 12 with a force of 6 to 10 pounds. The symmetrical relationship of the shoe loading spring 49 relative to the two radius arms 26, 27 insures that substantially equal forces are exerted on each of the two mirror image radius arms 26, 27. Thus, the smooth concave surface of the head support shoe 35 is not tilted in either direction along the surface of the drum 12 parallel to the axis of rotation of the drum. It is preferred to keep the difference between the forces acting on the two radius arms 26, 27 to a value less than 7%. Another important consideration is that the parallelism between the various parts which are referenced to the axis of rotation of the drum 12 should be kept to less than 3 parts in 10,000. This includes both the bearing pins 29 and the pivot pins 32, 33, as well as the V-groove surfaces 24 and 36 which are parallel to the axis of rotation, and the radius arms 26, 27 which are normal to the axis of rotation.

Another feature of mounting devices in accordance with the invention resides in the use of cooperative elements which insure freedom from contact between the head support shoe 35 and the drum 12 when the fluid boundary layer does not provide adequate lifting force. When the drum is being brought up to speed or is slowing down after being shut off, the loss of lifting force might result in contact between the shoe 35 and drum 12. During these intervals, therefore, the radius arms 26, 27 and the head support shoe 35 are pivoted away from the drum 12 surface, by the cam contour surfaces on the cam shafts 17. When the drum 12 is off speed, the motor 22 (FIGURE 1) coupled to the drive gear 19 which encompasses the axis of rotation of the drum 12 is shut off, and the action of the spring 21 rotates the cam shaft 17 into the first position in which the shoe 35 is safely separated from the drum 12. Thus, the cam shaft 17 occupies either a first position, in which the shoe 35 is held away from the drum 12, or a second position, in which the shoe 35 rides on the boundary layer.

Actually, in practical exemplifications of the invention, a head to drum spacing of the order of 200 to 300 microinches may be utilized. With this spacing, the cam shaft 17 need only pivot the shoe 35 a thousandth of an inch out of position in order to achieve the desired result. One possible difficulty which may be encountered on operation of the cam shaft 17 is overcome through the presence of the spring loaded friction buttons 43, 44. If the cam shaft 17 inadvertently acts to lift the ends of the radius arms 26, 27 too high, a state of instability may result because of the attitude of the shoe 35, and the shoe 35 and drum 12 surfaces may contact with resultant damage.

The friction buttons 43, 44, however, provide sufficient friction damping to counteract the weight of the shoe 35 and to maintain it in a substantially fixed relation to the radius arms 26, 27 when the cam lifting action is undertaken. Because the weight of the shoe 35 will usually be very much less than the forces generated by the lifting action of the boundary layer, the presence of the friction buttons 43, 44 does not interfere with the normal head positioning operation. Some friction damping is also provided by the spring friction clips 40, 41 which also help to lift the shoe 35 to the off speed position but do not interfere with normal operation.

The greatly enlarged representation of FIGURE 2 does not adequately show the compactness of the structure. With miniature magnetic heads, the total weight of the shoe and the magnetic heads may be less than 1.5 ounces, and the shoe itself may have a dimension of only 1.3 inches by 1.25 inches.

Another feature in accordance with the invention, shown in FIGURE 3, provides an appropriate indication whenever, through wear, accumulation of impurities or some sort of mechanical failure, there is likelihood of impending failure because of imminent forceful contact between the shoe 35 and the drum 12 surface. Here it should be recalled that the pivot pins 32, 33 are of an appropriate electrical insulating material, such as sapphire or glass. The friction buttons 43, 44 should also have like properties in this example. Under normal conditions of operation, therefore, the head support shoe 35 is electrically isolated from the drum 12. The head support shoe 35 is coupled in an electrical protective circuit which includes a voltage source 52 (here D.C.) and a relay meter 53. The source 52 and the meter 53 are coupled in series with the normally insulating spacing between the shoe 35 and the drum 12 surface. Appropriate brushes or other contact members for coupling to the rotating drum 12 could be used, but the conductive path between the frame 14 and the drum 12 through the bearings is used in this practical example. With this arrangement, there is no current flow in the protective circuit unless the insulating gap between the shoe 35 and the drum 12 is broken or greatly diminished, by contact of the shoe 35 against the drum surface, or reduction of the normal spacing between the two. When either of these things happens, there is momentary current flow in the relay meter 53. A number of commercially available relay meters are adjustable, so as to provide an appropriate indication or actuate the coupled recording device or other display mechanism, when the current flow exceeds a selected level. The relay meter 53 then may be used to actuate the motor 22 which operates the lift mechanism.

Although a mechanical lifting mechanism has been provided for the radius arms 26, 27 and the shoe 35, it will be appreciated that other systems can be used for this purpose. Thus, with a pneumatic pressure supply available, a flow of air may be directed through appropriate apertures in the shoe 35 against the drum 12 to lift the shoe 35 away from the drum when it is operating at less than the desired speed. Although the arrangement shown in FIGURES 1 and 2 uses only a very small motor 22 and is extremely compact, the cam shaft 17 may also be driven by individual rotary solenoids if this is more convenient. The present arrangement, however, has the advantage of ganging together all of the different cam shafts 17 while providing reliable and high speed operation.

Figure 4:
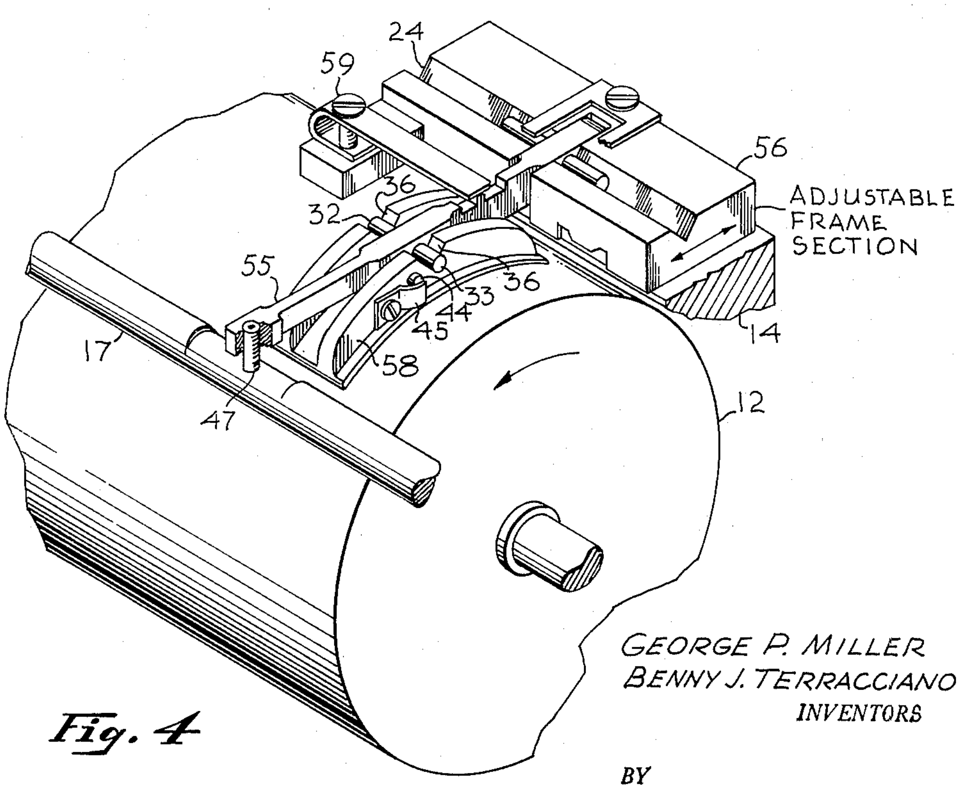
FIGURE 4 is a perspective view, partly broken away, of one alternative arrangement of a head positioning device in accordance with the invention.

In FIGURE 4, elements substantially like those of the mechanism of FIGURES 2 and 3 have been given similar numerical designations. The device shown in FIGURE 4 is an alternative arrangement in accordance with the invention which is particularly useful where the pivoted shoe is not required to carry as many heads and must operate in more limited space. A single radius arm 55 pivotally mounted in V-groove surfaces 24 in a frame 56 section includes centrally disposed pivot pins 32, 33 which permit pivotal movement of a head support shoe 58. The pivot pin member may be fabricated and attached as a single piece. The head support shoe 58 includes a ridge on either side of the single radius arm 55, and these ridges are provided with V-grooves 36 in which the pivot pins 32, 33 are seated as in the arrangement previously discussed. The remaining elements correspond to the mechanism of FIGURES 2 and 3, and need not be discussed in detail, except for a shoe loading spring 59 supported on one side of the frame 56 and bearing against a point contact surface on the single radius arm 55 between the pivot pins 32, 33 and the pivotal axis on the frame 56, to urge the shoe 58 toward the drum 12 with desired and controllable force.

Extreme compactness is achieved by this mechanism. In addition, a very useful feature is provided by the adjustable frame section 56, which is movable relative to the major part of the rigid frame 14 along appropriate ways. A micrometer adjustment mechanism may be utilized if desired. The direction in which the adjustable frame section 56 may be positioned is back and forth along a line which is substantially colinear with the direction of elongation of the single radius arm 55, and thus somewhat tangential to the drum 12. Although structural rigidity, accuracy and reliability are retained, the circumferential position of the heads relative to the drum 12 may thus be very simply adjusted with a high degree of precision. This feature is particularly significant for the many applications, such as recirculating registers, in which the angular postions of magnetc heads about a drum must be very closely controlled.

Figure 5:
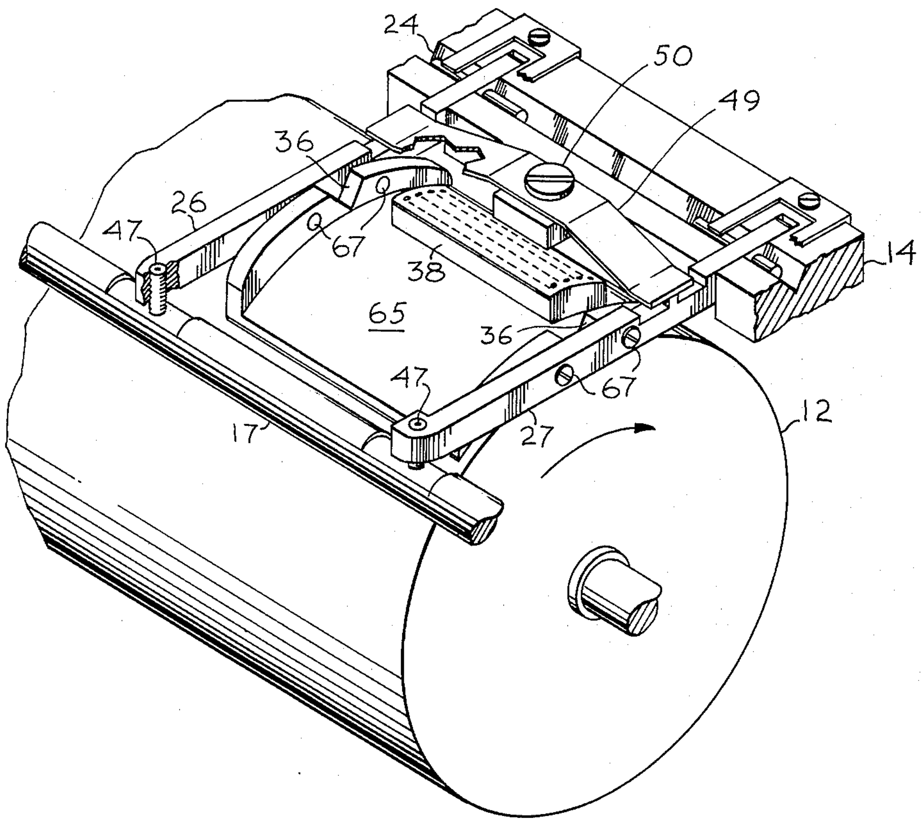
FIGURE 5 is a perspective view, partly broken away, of yet another head positioning device in accordance with the invention.

Another arrangement in accordance with the invention, which may be called a pivoted arm mechanism, is shown in detail in the enlarged view of FIGURE 5, in which the major portion of the frame and other related elements have been omitted for clarity, and only certain parts of which need be discussed in detail. Here the radious arms 26, 27 pivot about V-groove surfaces 24 in the frame 14, but the shoe 65 which supports the magnetic heads is fixedly mounted relative to the radius arms 26, 27 by shoe keeping screws 67. Although V-grooves 36 in the shoe do not perform any utilitarian function during operation in the magnetic recording system, they do provide convenient reference surfaces for machining the smooth concave surface of the shoe 65, and are accordingly retained in this construction.

Note that, as indicated in FIGURE 5, the rotation of the drum relative to the shoe is in the opposite sense to the rotation shown in the previous figures. Accordingly, the magnetic head assembly 38 is mounted on the opposite side of the shoe 65, in order to be adjacent the trailing edge of the shoe 65. Rotation of the drum 12 in the encompassing fluid medium again causes the shoe 65 to ride on the boundary layer of fluid at the surface of the drum 12, and to achieve a state of equilibrium between the lifting force exerted by the fluid and the force exerted by the shoe loading spring 49, as adjusted by the screw 50.

The elements are so disposed that the leading edge of the shoe 65 is maintained further away from the drum 12 surface than is the trailing edge of the shoe 65. In order to achieve stability, however, the geometry of the mechanism should be adjusted in accordance with certain considerations. Specifically, it is preferred to have the distance from the leading edge of the shoe 65 to the pivot point of the radius arms 26, 27 between 2.0 and 2.5 times greater than the distance from the trailing edge of the shoe to the pivot point of the radius arms 26, 27. This relationship controls the angle of attack of the shoe 65 relative to the drum 12 surface, from which the magnetic head to drum spacing may be precisely controlled.

It is also preferred, in conjunction with the arrangement of FIGURE 5, to utilize an adjustment procedure which assures proper axial and circumferential alignment of the various elements. A satisfactory procedure is as follows:

(1) The parts are assembled and all fastenings are made tight except for the shoe keeping screws 67. The clearance holes for these screws 67 in the radious arms 26, 27 are made somewhat oversize so that the shoe 65 has a certain amount of "float," with respect to the rest of the mechanism.

(2) The lift adjusting screws 47 in the ends of the radius arms 26, 27 which contact the cam shaft 17, are adjusted so that the radius arms 26, 27 are set to a position slightly below the desired operating position.

(3) The shoe 65 is then lightly held against the drum 12 surface with a suitable tool such as a force dynamometer gauge.

(4) The shoe keeping screws 67 are then made tight, thus setting the shoe 65 working surface parallel to that of the drum 12.

(5) The lift adjustment screws 47 are then reset to give the desired amount of lifting movement (usually 2 to 3 thousandths of an inch) for start and stop operations.

When the mechanism is thus assembled and adjusted, operative performance is enhanced. Again, it should be noted that close attention should be paid to constructional and operational details. It is preferred to employ an exact geometry and a fine finish on both the drum and shoe operating surfaces (preferably better than 5 microinches rms. roughness). In addition, clean, dust-free operating conditions are to be utilized wherever possible.

Although a number of different alternative expedients useful in the practice of the invention have been discussed, it will be appreciated that many further variations will suggest themselves to those skilled in the art. Accordingly, the invention should be considered to include all modifications and substitutions falling within the scope of the appended claims.

We claim:

1. A magnetic head mounting device for holding magnetic heads in a close non-contacting relation to a magnetic drum, including a frame positioned adjacent the drum, the frame including V-groove surfaces extending parallel to the axis of rotation of the drum, radius arm means lying in a plane normal to the axis of rotation of the drum and spaced apart from the drum, bearing means coupled at a first end of the radius arm means and registering in the V-groove surfaces, to permit the radius arm means to pivot about the V-groove surfaces, shoe support means positioned in a central part of the radius arm means and extending parallel to the axis of rotation of the drum, a magnetic head support shoe coupled to the shoe support means, the magnetic head support shoe having a smooth concave surface facing and substantially mating with the surface of the drum, spring means coupled to the frame and engaging the radius arm means between the bearing means and the shoe support means, the spring means urging the radius arm means toward the drum with selected force and uniformly with respect to the axis of the drum, and cam means disposed adjacent the second end of the support arm means for selectively pivoting the support arm means away from the drum.

2. A magnetic head mounting device for holding a magnetic head in a selected position relative to a rotating magnetic drum, including a frame positioned adjacent the drum, support arm means pivotally mounted in the frame about an axis parallel to the axis of rotation of the drum, and extending past the drum surface, a magnetic head support shoe coupled to the support arm means in a central part thereof and riding on a fluid film on the surface of the rotating drum, spring means coupled to the frame and engaging the support arm means between the pivot point and the coupling to the magnetic head support shoe, the spring means urging the support arm means and the head support shoe toward the drum, and cam means disposed adjacent the second end of the support arm means for selectively pivoting the support arm means away from the drum.

3. A magnetic head mounting device for use with a moving magnetic member, including a frame positioned adjacent the moving magnetic member, support means pivotally mounted in the frame and extending adjacent the moving magnetic member, magnetic head support means coupled to the support arm means in a central region thereof, the magnetic head support means riding on a fluid film on the surface of the moving magnetic member, spring means coupled to the frame and to the support arm means to urge the support arm means toward the moving magnetic member between the frame and the coupling to the magnetic head support means, and means engaging the support arm means at the free ends thereof for lifting the head support means away from the moving magnetic member.

4. A magnetic head mounting device for use with a magnetic drum including a frame, radius arm means pivotally mounted on the frame and extending adjacent the drum, a head support shoe pivotally mounted on the radius arm means in a central part thereof and including a concave surface shaped to the drum, the concave surface being maintained spaced apart from the drum by the boundary layer of fluid moving with the drum, spring means coupled to the frame and bearing against the radius arm means to urge the arm means toward the drum, and means coupled to the radius arm means and in contact with the head support shoe for frictionally damping movement of the head support shoe.

5. A magnetic head mounting device for use with a magnetic drum rotating in a fluid medium, including in combination a frame positioned adjacent the drum, radius arm means pivotally mounted in the frame and extending past the surface of the drum, a head support shoe having V-groove surfaces parallel to the axis of rotation of the drum, bearing means extending from the radius arm means along an axis parallel to the axis of rotation of the drum, the bearing means engaging the V-groove surfaces of the head support shoe to pivotally mount the head support shoe relative to the radius arm means, the head support shoe including a concave surface shaped to the drum and riding on a surface film of fluid medium moving with the drum, spring means coupled to the frame and engaging the radius arm means between the radius members and the point of pivot on the frame to urge the arm means and the head support shoe toward the drum, means coupled to the radius arm means and engaging the head support shoe for frictionally damping movement of the head support shoe about the bearing members, and means responsive to the speed of rotation of the magnetic drum and engaging the free end of the radius arm means for selectively pivoting the radius arm means away from the drum to lift the head support shoe away from the drum surface when the drum is moving at less than a selected rate of speed.

6. The invention as set forth in claim 5, wherein the spring means acts on the radius arm means with uniform distribution of pressure along the axis of rotation of the drum, and provides sufficient total force to cause the head support shoe to be maintained with a relatively minute spacing from the drum surface, wherein the means for moving the radius arm means away from the drum is a rotatable cam member, and wherein the bearing means are electrical insulating members.

7. A mechanism for maintaining at least one magnetic head in close but non-contacting relation to a magnetic drum rotating at high speed in air, including a frame member adjacent the drum, the frame member including V-groove surfaces lying along an axis substantially parallel to the axis of rotation of the drum, a pair of radius arm members extending normal to the axis of the V-groove surfaces and including bearing pins pivotally seating therein, the radius arm members extending from the V-groove surface past the drum in a direction opposite to the drum rotation and being substantially parallel a magnetic head support shoe coupled between the radius arm members, the magnetic head support shoe substantially mating with the drum curvature and being so mounted on the radius arm members that the distance between the leading edge of the shoe and the axis of the V-groove surfaces is between 2.0 and 2.5 times the distance of the trailing edge of the shoe and the axis of the V-groove surfaces, and spring means coupled to the frame member and transversely spanning the radius arm members, the spring means engaging both radius arm members at like intermediate points along the length thereof between the bearing pins and the point of mounting of the magnetic head support shoe on the radius arm members to urge the shoe into the air boundary layer at the drum surface with a selected force.

8. A fluid supported magnetic head mechanism including a pair of support arm means, a head support means pivotally mounted in and between the support arm means and including a shaped surface for providing a fluid bearing operation, and friction damping means mounted on the support arm means and engaging the head support means, said friction damping means including a fixed friction button engaging one side of the head support means and a movable friction button engaging the opposite side of the head support means

9. A fluid supported magnetic head mechanism including support arm means including a pair of V-groove support surfaces, a head support means including a shaped surface providing a fluid bearing, the head support means being pivotally mounted in and between the V-groove support surfaces, a fixed friction button mounted adjacent one of the V-groove support surfaces and extending into contact with one side of the head support means, a movable friction button mounted adjacent the other of the V-groove support surfaces and extending into contact with the other side of the head support means, and spring clip means mounted on the support arm means and engaging the head support means to maintain the head support means seated in the V-groove support surfaces, the frictional restraint on pivotal movement of the head support means being sufficient to overcome the weight of the head support means while not being sufficient to interfere with fluid bearing operation.

10. A positioning system for maintaining magnetic heads in close but non-contacting relations to a magnetic drum including a frame adjacent the drum, radius arm means pivotally mounted in the frame and extending adjacent the drum, a head support shoe including pivot surfaces, the head support shoe having a shaped surface for riding on the boundary layer of air on the surface of the drum, pivot pins of non-conductive material mounted in the radius arm means and pivotally engaging the pivot surfaces, friction damping means of non-conductive material mounted in the radius arm means and engaging the head support shoe, selectively operable means coupled to the radius arm means for moving the head support shoe away from the drum, and circuit means conductively coupled to the head support shoe and to the drum for sensing proximate contact between the shoe and drum, the circuit means being coupled to control the selectively operable means.

References Cited by the Examiner

UNITED STATES PATENTS

| | | | |
|---|---|---|---|
| 2,862,781 | 12/1958 | Baumeister ------- | 179—100.2 |
| 3,086,088 | 4/1963 | Maclay et al. ------ | 340—174.1 |

FOREIGN PATENTS

| | | |
|---|---|---|
| 758,865 | 4/1954 | Great Britain. |

IRVING L. SRAGOW, *Primary Examiner.*

ELI J. SAX, *Examiner.*